United States Patent
Jorgensen et al.

(10) Patent No.: US 12,136,503 B2
(45) Date of Patent: Nov. 5, 2024

(54) LOW RESISTANCE POLYETHYLENE SHEATH WITH COMBINED ADHESIVE AND MECHANICAL PROPERTIES

(71) Applicant: NEXANS, Courbevoie (FR)

(72) Inventors: Simon Jorgensen, Sellebakk (NO); Audun Johanson, Oslo (NO); Massimiliano Mauri, Borgenhaugen (NO)

(73) Assignee: NEXANS, Courbevoie (FR)

( * ) Notice: Subject to any disclaimer, the term of this patent is extended or adjusted under 35 U.S.C. 154(b) by 113 days.

(21) Appl. No.: 17/701,357

(22) Filed: Mar. 22, 2022

(65) Prior Publication Data

US 2022/0336121 A1  Oct. 20, 2022

(30) Foreign Application Priority Data

Mar. 29, 2021 (EP) .................................. 21 305 394

(51) Int. Cl.
| | |
|---|---|
| *H01B 7/28* | (2006.01) |
| *B29C 48/00* | (2019.01) |
| *B29C 48/05* | (2019.01) |
| *B29C 48/154* | (2019.01) |
| *C08L 23/06* | (2006.01) |
| *H01B 7/282* | (2006.01) |

(52) U.S. Cl.
CPC .......... *H01B 7/2825* (2013.01); *B29C 48/022* (2019.02); *B29C 48/05* (2019.02); *B29C 48/154* (2019.02); *C08L 23/06* (2013.01); *B29K 2023/06* (2013.01); *C08L 2203/202* (2013.01); *C08L 2207/064* (2013.01); *C08L 2207/066* (2013.01)

(58) Field of Classification Search
CPC ....... B29C 48/05; B29C 48/22; B29C 48/154; C08L 2203/202; C08L 2207/064; C08L 2207/066; C08L 23/06
USPC ............. 174/102 R, 102 SC, 105 SC, 106 R, 174/106 SC, 107, 119 R; 428/381, 389, 428/461
See application file for complete search history.

(56) References Cited

U.S. PATENT DOCUMENTS

| | | | |
|---|---|---|---|
| 4,145,567 A | | 3/1979 | Bahder et al. |
| 4,454,379 A | * | 6/1984 | Cleveland ............ H01B 7/2825 174/106 SC |

(Continued)

FOREIGN PATENT DOCUMENTS

| | | | | |
|---|---|---|---|---|
| EP | 3 786 982 | | 3/2021 | |
| FR | 3786982 A1 | * | 8/2019 | ............. H01B 7/282 |

(Continued)

OTHER PUBLICATIONS

European Search Report dated Sep. 16, 2021.

(Continued)

*Primary Examiner* — William H. Mayo, III

(74) *Attorney, Agent, or Firm* — Sofer & Haroun, LLP

(57) ABSTRACT

A water barrier for encapsulating a cable core has a layer of metal foil having a thickness of $t_1$, and a single layer of a polyethylene-based polymer having a thickness of $t_2$. The ratio $t_2$: $t_1$ is at least seven, and the single layer of a polyethylene-based polymer has been deposited onto the metal foil by extrusion at an extrusion temperature of at least 150° C., with the metal foil preheated to a temperature of at least 130° C.

21 Claims, 2 Drawing Sheets

(56) References Cited

U.S. PATENT DOCUMENTS

| | | | | | |
|---|---|---|---|---|---|
| 4,725,693 | A | * | 2/1988 | Hirsch | B32B 7/14 |
| | | | | | 174/106 SC |
| 9,029,705 | B2 | * | 5/2015 | Furuheim | H01B 7/28 |
| | | | | | 174/102 R |
| 11,631,505 | B2 | * | 4/2023 | Johanson | H01B 1/026 |
| | | | | | 174/107 |
| 2019/0066871 | A1 | * | 2/2019 | Johanson | H01B 7/14 |

FOREIGN PATENT DOCUMENTS

| | | | | | |
|---|---|---|---|---|---|
| GB | 1172483 | A | * | 8/1964 | H01B 13/22 |
| GB | 1 172 483 | | | 12/1969 | |
| GB | 2513991 | A | * | 11/2014 | H01B 7/282 |
| WO | 2019223878 | | | 11/2019 | |

OTHER PUBLICATIONS

Third party observation dated Feb. 9, 2024.
Worzyk, Thomas. Submarine Power Cables—Design, Installation, Repair, Environmental Aspects, 2009.
Giles, Harold F. et al. Extrusion: The Definitive Processing Guide and Handbook. 2005 ISBN: 0-8155-1473-5.

* cited by examiner

LOW RESISTANCE POLYETHYLENE SHEATH WITH COMBINED ADHESIVE AND MECHANICAL PROPERTIES

RELATED APPLICATION

This application claims the benefit of priority from European Patent Application No. 21 305 394.5, filed on Mar. 29, 2021, the entirety of which is incorporated by reference.

FIELD OF THE INVENTION

The present invention relates to a lightweight, lead-free and mechanically reinforced water barrier suited for dynamical submarine power cables.

BACKGROUND

The current carrying parts of power cables may need to be kept dry. Intrusion of humidity or water may cause electrical breakdown of the power cable insulation system. The core section of power cables is therefore usually protected by a water barrier arranged radially around the cable core. Up to date, the dominating material in water barriers for power cables is lead since lead has proven to be a reliable and sturdy sheathing material.

Several solutions for insulation system for providing water barriers to submarine power cables are known, but all have various disadvantages that should be overcome. One drawback is that lead is a high-density materiel adding significant weight to the cable. The heavy weight induces extra costs in the entire value chain from production, under transport, storage, deployment, and when the cable is discarded after reaching its lifetime. Another drawback is that lead has a relatively low fatigue resistance making leaden water barriers less suited for dynamical power cables. Furthermore, lead is a rather poisonous material increasingly meeting environmental regulation restrictions. An environmentally friendly replacement of lead as water barrier in power cables is required.

EP 2 312 591 discloses a submarine power cable comprising an electrical conductor surrounded by an insulation, said insulation being surrounded by a metallic moisture barrier characterized in that the cable further comprises a semi-conductive adhesive layer surrounding said metallic moisture barrier, and a semi-conductive polymeric jacket able to be in electrical contact with sea water surrounding said semi-conductive adhesive layer, the overlaying of the metallic moisture barrier, the semi-conductive adhesive layer and the semi-conductive polymeric jacket forming a 3-layer sheath.

WO 2019/223878 discloses a power cable comprises an insulated conductor: a copper water barrier, in form of a tube with a welding line, surrounding each insulated conductor; and a polymeric sheath surrounding each copper water barrier. The copper water barrier has a thickness and the polymeric sheath has a thickness such that a ratio between the thickness of the copper water barrier and the thickness of the polymeric sheath is 0.15 at most.

Objective of the Invention

The main objective of the invention is to provide a lightweight, lead-free and mechanically reinforced water barrier suited for dynamical submarine power cables.

SUMMARY OF THE INVENTION

The present invention is defined by the appended claims and in the following.

The objective of the invention may be obtained by utilising a semi-conductive single-layer polyethylene-based layer onto a foil of Al, Cu or Fe or an alloy thereof laid circumferentially around a power cable core, and wherein the semi-conductive and single-layer polyethylene-based layer is given the required mechanical strength by having a minimum layer thickness relative to the metal foil layer.

A further objective is to achieve a sufficient adhesion between the metal foil and the semi-conductive single-layer polyethylene-based layer. This further objective can be achieved by depositing the semi-conductive single-layer polyethylene-based layer onto the metal foil layer by extrusion at an extrusion temperature of at least 100° C., the metal foil layer being preferably also heated at a temperature of at least 100° C.

Thus, in a first aspect, the invention relates to a water barrier for surrounding a cable core, wherein the water barrier consists of:
- an inner layer of metal foil having a thickness of $t_1$, and
- an outer single-layer of a polyethylene-based polymer having a thickness of $t_2$, wherein the ratio $t_2:t_1$ is at least 7.

The difference in thickness, i.e. the ratio $t_2:t_1$, provides the required mechanical reinforcement making the water barrier fatigue resistant and able to tolerate the cable being bended without the metal foil layer becoming buckled.

The term "layer of metal foil" or "metal foil layer" as used herein, refers to the metal layer acting as the water barrier. The invention is not tied to use of any specific metal/metal alloy or thickness of the metal foil. Any metal/metal alloy at any thickness known to be suited for use in water barriers in power cables by the skilled person may be applied. The metal foil can be welded or otherwise placed so that metal foil forms a waterproof barrier.

In an exemplary embodiment, the single layer of a polyethylene-based polymer may have been deposited onto the metal foil layer by extrusion at an extrusion temperature of at least 100° C., at least 110° C., at least 120° C., at least 130° C., at least 140° C. or at least 150° C. In another embodiment the extrusion temperature is between 100° C. and 150° C. In another embodiment the extrusion temperature is between 150° C. and 200° C. In another embodiment the extrusion temperature is between 200° C. and 250° C.

In another embodiment the metal foil layer the outer surface of the metal foil layer is preheated to the said extrusion temperature of at least 100° C. In another embodiment the surface temperature is between 100° C. and 150° C. In another embodiment the surface temperature is between 150° C. and 200° C. In another embodiment the extrusion temperature is between 200° C. and 250° C.

In another embodiment, the ratio $t_2:t_1$ may be between 10 and 100. In another embodiment, the ratio $t_2:t_1$ is between 15 and 50. In another embodiment, the ratio $t_2:t_1$ is between 20 and 40. In another embodiment, the ratio $t_2:t_1$ is between 25 and 30. In another embodiment, the ratio $t_2:t_1$ is between 7 and 20.

In a particular embodiment the extrusion temperature of the single layer of a polyethylene-based polymer and the surface temperature of the metal foil layer are substantially the same.

In another embodiment, the metal foil layer is thoroughly cleaned from grease and dirt before this process.

In an exemplary embodiment, the metal foil may be either an Al/Al-alloy such as for example pure Al, an AA1xxx series, an AA5xxx series or an AA6xxx series alloy according to the Aluminium Association Standard, or a Cu/Cu-alloy such as for example pure Cu, a CuNi-alloy or a CuNiSi-alloy, or a Fe/Fe-alloy, such for example pure Fe, stainless alloy SS316 or S32750.

In another embodiment, the metal foil may be a copper alloy. In a preferred embodiment, the metal foil may be pure copper or a CuNiSi-alloy. The term "pure" is used herein to refer to less than 1 weight-% impurities.

In another embodiment the metal foil (or the metallic tube) may be non-corrugated in order to get a substantially 100% void-free interface between the single-layer of a polyethylene-based polymer and said metal foil layer (or the metallic tube).

The thickness, $t_1$, of the metal foil layer may in an example embodiment be in one of the following ranges; from 10 to 1000 μm, preferably from 10 to 700 μm, more preferably from 10 to 500 μm, more preferably from 10 to 250 μm, and most preferably from 10 to 75 μm.

The term "single layer of a semi-conductive polyethylene-based polymer" as used herein, refers to the polymer layer laid onto the metal foil layer and functions as a mechanical reinforcement of the water barrier metal foil layer. In other words, the polymer layer is laid directly onto the metal foil layer without an intermediate layer of adhesive.

The polyethylene-based polymer may in one example embodiment be made of a low density polyethylene (LDPE), a linear low density polyethylene (LLDPE), a medium density polyethylene (MDPE), or a high density polyethylene (HDPE) constituted of a copolymer of ethylene with one or more polar monomers of acrylic acid, methacrylic acid, glycidyl methacrylate, maleic acid, or maleic anhydride.

Examples of suitable polyethylene-based polymers include, but are not limited to: copolymer of ethylene and ethyl acrylate or similar acrylates; copolymer of ethylene and ethyl acrylic acid, methacrylic acid or similar; copolymer of ethylene and glycidyl methacrylate or similar epoxy-based monomer such as 1,2-epoxy-1-butene or similar; or copolymer of ethylene and maleic-anhydride, or similar. These copolymers of ethylene with one or more polar monomers will obtain an excellent adherence to the metal foil layer if deposited by an extrusion at elevated temperatures of at least 100° C. for the polymer and at least 100° C. for the outer surface of the metal foil layer.

In one embodiment, the value of the adhesion of the semi-conductive polymeric layer onto the metal foil layer is more than 0.5 N/mm according to IEC62067. In an alternative embodiment the value of the adhesion is in the range of 0.5 to 5 N/mm according to IEC62067. In an alternative embodiment the value of the adhesion is in the range of 1.0 to 1.5 N/mm according to IEC62067.

The polyethylene-based polymer may in one exemplary embodiment be made electrically semi-conducting by addition and homogenisation 4 to 40 weight % particulate carbon, silver or aluminium in the polymer mass to enable carrying away capacitive charges.

Examples of suited particulate carbon include but are not limited to; comminuted petrol coke, comminuted anthracite, comminuted char coal, carbon black, carbon nanotubes, etc.

In another embodiment, the particulate carbon may be carbon black.

The term "semi-conducting" as used herein, refers to an intermediate level of electric conductivity, i.e. an electric conductivity falling between the electric conductivity of an electric conductor and an electric insulator.

In a second aspect, the invention relates to a power cable comprising the water barrier according to the first aspect of the invention.

In an embodiment of the power cable, the water barrier may be the outermost layer of the power cable.

In another embodiment of the power cable, the water barrier may be covered with armouring or an outer mantel.

In another aspect, the invention relates to a method for manufacturing a water barrier for surrounding a cable core, the method comprising the steps of:
a) providing a layer of lead-free metal foil having a thickness of $t_1$,
b) welding said layer around a cable core,
c) heating a polyethylene-based polymer at an extrusion temperature of at least 100° C.,
d) heating the outer surface of the layer of metal foil to a temperature of at least 100° C.,
e) depositing onto the layer of metal foil (4), by extrusion, a single layer of a polyethylene-based polymer (5) having a thickness of $t_2$, at an extrusion temperature of at least 100° C.

wherein the ratio $t_2:t_1$ is at least 7.

BRIEF DESCRIPTION OF THE DRAWINGS

The present invention is described in detail by reference to the following drawings.

DETAILED DESCRIPTION OF THE INVENTION

High-voltage subsea power cables operating with highest continuous voltage (Um) over 72.5 kV are required to be dry, and they are usually sheathed with a lead water-barrier at Um>36 kV as recommended by IEC 60840. Lead sheathing has been under scrutiny because of the negative impact of lead on the environment and will most likely be banned in the future. This means that alternative solutions need to be developed.

The use of a lead-free metal and polyethylene laminate as water barrier has been evaluated as an alternative solution. One challenge associated with water barriers of stiffer materials such as welded copper is a reduced buckling resistance under bending.

Lead-free water barrier known in the art describe a laminate system, comprising a metal foil layer, an adhesive layer and a polymeric jacket.

Figure 1A:
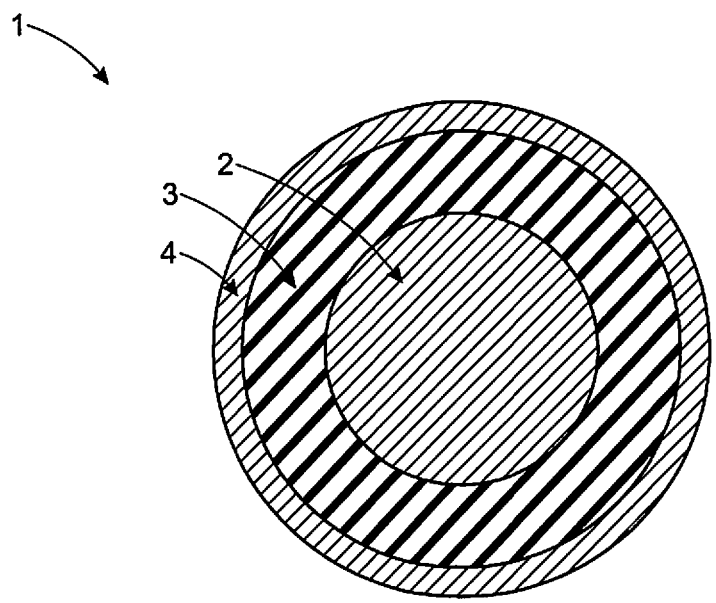
FIG. 1a-b is a cross-sectional view of the assembly of the lead-free buckling resistant water barrier around an insulated electrical conductor.

Assembly of the present invention, in a dry high voltage subsea power cable 1 is illustrated in FIG. 1. An electrical conductor 2 is surrounded by an insulation system 3. Said electrical conductor 2 and insulation system 3 are known in the art. Around this isolated cable conductor (2, 3), a layer of metal foil 4 having a thickness of $t_1$ is arranged and welded, as shown in FIG. 1a.

Figure 1B:
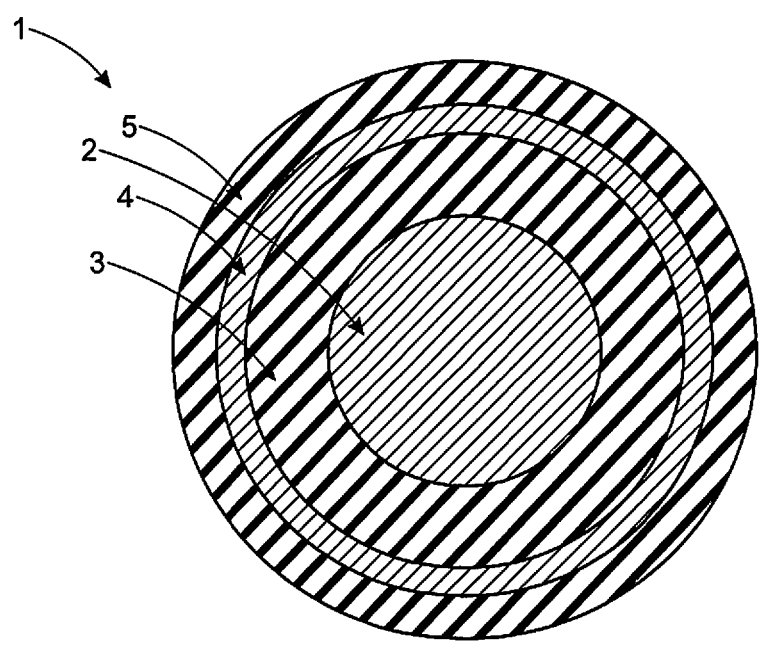

Thereafter, as shown in FIG. 1b, a single layer of a polyethylene-based polymer 5 having a thickness of $t_2$ is deposited on the clean metal foil layer 4 by extrusion at an extrusion temperature of at least 100° C. with the metal foil layer 4 preheated to a temperature of at least 100° C.

The Metal Foil Layer 4

The metal foil layer 4 according to the present invention can have a thickness needed to meet electrical properties requirements and fatigue resistance according to the invention.

The metal foil layer 4 is formed from a conducting metal material, preferably consisting of copper, steel or aluminum, for example, and more preferably from a readily weldable metal. In one example embodiment, the metal foil is either an Al/Al-alloy such as for example an AA1xxx series, an AA5xxx series or an AA6xxx series alloy according to the Aluminium Association Standard, or a Cu/Cu-alloy such as for example pure Cu, a CuNi-alloy or a CuNiSi-alloy, or a Fe/Fe-alloy, such for example stainless alloy SS316 or S32750. The most preferred metallic moisture barrier is a copper alloy moisture barrier, preferably pure Cu or a CuNiSi-alloy.

The most preferred design of the metal foil layer 4 is a tube, so that the metal foil layer 4 is preferably a metallic tube.

The metal foil layer 4 may be obtained from a strip of metal, which can be wrapped around the insulation of the electrical conductor. Then the metallic strip may be longitudinally welded to form an exogenous or autogenously welded metallic tube.

The diameter of the welded sheath may thereby be reduced by either drawing or rolling.

The metal foil 4 (or the metallic tube) may preferably be non-corrugated in order to get a substantially 100% void-free interface between the single-layer of a polyethylene-based polymer 5 and said metal foil layer 4 (or said metallic tube).

The thickness, $t_1$, of the metal foil layer 4 may in an example embodiment be in one of the following ranges; from 10 to 1000 μm, preferably from 10 to 700 μm, more preferably from 10 to 500 μm, more preferably from 10 to 250 μm, and most preferably from 10 to 75 μm.

The Semi-Conductive Polymeric Layer 5

The semi-conductive polymeric layer 5 is typically any polyethylene-based polymer used in electrical insulation applications, and being preferably easily extrudable, which has been rendered semi-conductive by incorporation of electrically semi-conductive filler.

The polyethylene-based polymer may in one example embodiment be either a low density polyethylene (LDPE), a linear low density polyethylene (LLDPE), a medium density polyethylene (MDPE), or a high density polyethylene (HDPE) constituted of a copolymer of ethylene with one or more polar monomers of acrylic acid, methacrylic acid, glycidyl methacrylate, maleic acid, or maleic anhydride or any combination thereof.

Examples of suitable polyethylene-based polymers include, but are not limited to:
  copolymer of ethylene and ethyl acrylate or similar acrylates;
  copolymer of ethylene and ethyl acrylic acid, methacrylic acid or similar;
  copolymer of ethylene and glycidyl methacrylate or similar epoxy-based monomer such as 1,2-epoxy-1-butene or similar; or
  copolymer of ethylene and maleic-anhydride, or similar.

These copolymer of ethylene with one or more polar monomers will obtain an excellent adherence to the metal foil layer 4 if deposited by an extrusion et elevated temperature of at least 100° C. for the polymer and of at least 100° C. for the outer surface of the metal foil. These temperatures are chosen independently. According to a particular embodiment of the invention, these temperatures are identical.

The polyethylene-based polymer may in one example embodiment be made electrically semi-conducting by addition and homogenisation of 4 to 40 weight % particulate carbon, silver or aluminium in the polymer mass to enable carrying away capacitive charges.

Examples of suited particulate carbon includes but is not limited to: comminuted petrol coke, comminuted anthracite, comminuted char coal, carbon black, carbon nanotubes, etc.

The preferred semi-conductive polymer layer 5 has incorporated therein a loading of carbon black from 4 to 30% by weight of the composition.

According to a particular embodiment of the invention, the semi-conductive polymeric layer 5 can be the most outer layer of the cable.

Furthermore, the semi-conductive polymeric layer 5 may be not cross-linked.

Since there is no adhesive layer between the metal foil layer 4 and the semi-conductive polymeric layer 5, in order for the polymer layer 5 to have a better adhesion to the metal foil layer 4, it may advantageously be extruded at high temperatures over 100° C., and the outer surface of the metal foil layer 4 may also advantageously be pre-heated at over 100° C. This can be achieved for example by induction heating or by air heating. The outer surface of the metal foil layer 4 may also advantageously be thoroughly cleaned from grease and dirt before this process. The polymer layer 5 is of sufficient thickness to guarantee the necessary mechanical stability, that is to say at least seven times thicker than the metal foil layer 4.

Testing of the adhesion of the semi-conductive polymeric layer 5 onto the metal foil layer 4 may be conducted according to IEC62067. To be sufficient, the peeling strength shall be more than 0.5 N/mm according to IEC62067.

In one embodiment, the value of the adhesion of the semi-conductive polymeric layer 5 onto the metal foil layer 4 is more than 0.5 N/mm according to IEC62067. In an alternative embodiment the value of the adhesion is in the range of 0.5 to 5 N/mm according to IEC62067. In an alternative embodiment the value of the adhesion is in the range of 1.0 to 1.5 N/mm according to IEC62067.

Outer Layer

Figure 2:
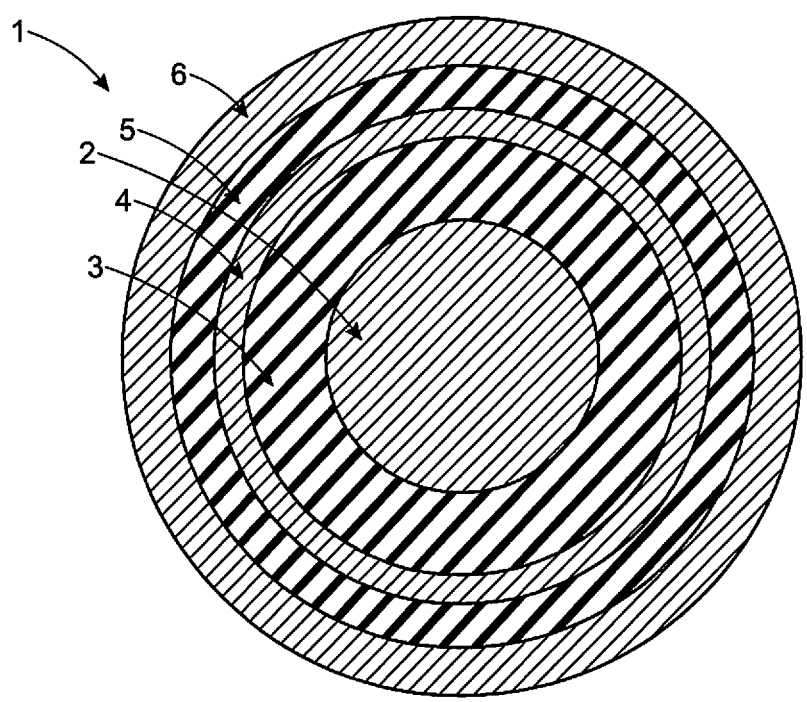
FIG. 2 is a cross-sectional view of an alternative embodiment of the submarine high-voltage cable with an additional layer surrounding the water barrier.

As shown in FIG. 2, the submarine power cable comprising the water barrier according to the invention may also comprise a supplementary layer that can for example be armouring or an outer mantel.

The invention claimed is:

1. A water barrier for surrounding a cable core, said water barrier comprising:
   an inner layer of lead-free metal foil having a thickness of $t_1$, said inner layer of lead-free metal foil being laid circumferentially around the cable core, and
   a continuous outer single layer of a polyethylene-based semi-conducting polymer having a thickness of $t_2$,
   wherein the ratio $t_2 : t_1$ is at least 7, and
   wherein the outer single layer of the polyethylene-based semi-conducting polymer is laid directly onto the inner layer of lead-free metal foil without an intermediate layer of adhesive,
   wherein the value of the adhesion of the semi-conductive polymeric layer onto the metal foil layer being more than 0.5 N/mm according to IEC62067".

2. The water barrier according to claim 1, wherein the single layer of a polyethylene-based semi-conducting polymer has been deposited by extrusion at an extrusion temperature of at least 100° C. onto the metal foil layer, the outer surface of the metal foil being heated to a temperature of at least 100° C.

3. The water barrier according to claim 1, wherein the metal foil is selected from the group consisting of:
   aluminium, an aluminium alloy of the AA1xxx series, AA5xxx series or the AA6xxx series according to the Aluminium Association Standard,
copper,
a copper-alloy,
a CuNi-alloy,
a CuNiSi-alloy,
iron,
a Fe-alloy,
a stainless steel alloy SS316,
and
a stainless steel alloy S32750.

4. The water barrier according to claim 1, wherein the metal foil is selected from the group consisting of pure copper and a Cu-alloy.

5. The water barrier according to claim 4, wherein the metal foil is selected from the group consisting of pure copper, a CuNi-alloy and a CuNiSi-alloy.

6. The water barrier according to claim 1, wherein the metal foil layer is non-corrugated.

7. The water barrier according to claim 1, wherein the thickness of the metal foil is from 10 to 1000 μm.

8. The water barrier according to claim 1, wherein the polymer of the single layer of a polyethylene-based semi-conducting polymer is selected from the group consisting of: a low density polyethylene (LDPE), a linear low density polyethylene (LLDPE), a medium density polyethylene (MDPE), and a high density polyethylene (HDPE), constituted of a copolymer of ethylene with one or more polar monomers selected from the group consisting of acrylic acid, methacrylic acid, glycidyl methacrylate, maleic acid, or maleic anhydride and any combination thereof.

9. The water barrier according to claim 1, wherein the polyethylene-based polymer is made electrically semi-conducting by addition and homogenisation of 4 to 40 weight % particulate carbon, silver or aluminum in the polymer mass.

10. The water barrier according to claim 9, wherein the particulate carbon is selected from the group consisting of comminuted petrol coke, comminuted anthracite, comminuted char coal, carbon black, and carbon nanotubes.

11. The water barrier according to claim 9, wherein the particulate carbon is carbon black.

12. A power cable comprising the water barrier according to claim 1, wherein the water barrier surrounds a cable core of said power cable.

13. The power cable according to claim 12, wherein the water barrier is outermost layer of the power cable.

14. The power cable according to claim 12, wherein the water barrier is covered with armouring or an outer mantel.

15. The water barrier according to claim 1, wherein the thickness of the metal foil is from 10 to 700 μm.

16. The water barrier according to claim 1, wherein the thickness of the metal foil is from 10 to 500 μm.

17. The water barrier according to claim 1, wherein the thickness of the metal foil is from 10 to 250 μm.

18. The water barrier according to claim 1, wherein the thickness of the metal foil is from 10 to 75 μm.

19. The water barrier as claimed in claim 1, wherein the outer single layer of polyethylene-based semi-conducting polymer is laid directly onto the inner layer of lead-free matal foil without an intermediate layer of adhesive.

20. A method of manufacturing a water barrier for surrounding a cable core, the method comprising the steps of:
a) providing a layer of lead-free metal foil having a thickness $t_1$, said layer of lead-free metal foil being laid circumferentially around the cable core,
b) welding said layer around the cable core,
c) heating a semi-conducting polyethylene-based polymer to a temperature of at least 100° ° C.,
d) heating the outer surface of the metal foil layer to a temperature of at least 100° C., and
e) depositing onto the outer surface of the metal foil layer by extrusion a continuous single layer of a polyethylene-based polymer having a thickness $t_2$, at an extrusion temperature of at least 100° C., wherein the ratio $t_2 : t_1$ is at least 7, and wherein the outer single layer of the polyethylene-based semi-conducting polymer is laid directly onto the inner layer of lead-free metal foil without an intermediate layer of adhesive,
wherein the value of the adhesion of the semi-conductive polymeric layer onto the metal foil layer being more than 0.5 N/mm according to IEC62067".

21. A water barrier for surrounding a cable core, the water having
an inner layer of lead-free metal foil having a thickness of $t_1$, said inner layer of lead-free metal foil being laid circumferentially around the cable core, wherein said inner layer is welded around said cable core, and
a continuous outer single layer of a polyethylene-based semi-conducting polymer having a thickness of $t_2$, said outer layer being applied by heating a semi-conducting polyethylene-based polymer to a temperature of at least 100° C., heating the outer surface of the metal foil layer to a temperature of at least 100° C., and depositing onto the outer surface of the metal foil layer by extrusion a single layer of a polyethylene-based polymer having a thickness $t_2$, at an extrusion temperature of at least 100° C.,
wherein the ratio $t_2 : t_1$ is at least 7, and
wherein the outer single layer of the polyethylene-based semi-conducting polymer is laid directly onto the inner layer of lead-free metal foil without an intermediate layer of adhesive,
wherein the value of the adhesion of the semi-conductive polymeric layer onto the metal foil layer being more than 0.5 N/mm according to IEC62067".

* * * * *